United States Patent
Hornbach et al.

(10) Patent No.: US 9,222,366 B2
(45) Date of Patent: Dec. 29, 2015

(54) EXHAUST-GAS TURBOCHARGER

(75) Inventors: Johannes Hornbach, Frankenthal (DE); Martin Becker, Malsch (DE); Thomas Koerner, Recklinghausen (DE)

(73) Assignee: BorgWarner Inc., Auburn Hills, MI (US)

(*) Notice: Subject to any disclaimer, the term of this patent is extended or adjusted under 35 U.S.C. 154(b) by 232 days.

(21) Appl. No.: 13/816,516

(22) PCT Filed: Aug. 18, 2011

(86) PCT No.: PCT/US2011/048219
§ 371 (c)(1),
(2), (4) Date: Feb. 12, 2013

(87) PCT Pub. No.: WO2012/027184
PCT Pub. Date: Mar. 1, 2012

(65) Prior Publication Data
US 2013/0142679 A1   Jun. 6, 2013

(30) Foreign Application Priority Data

Aug. 24, 2010   (DE) .................. 10 2010 035 282

(51) Int. Cl.
| | |
|---|---|
| *F01D 25/16* | (2006.01) |
| *F01D 25/18* | (2006.01) |
| *F16C 17/18* | (2006.01) |

(52) U.S. Cl.
CPC .............. *F01D 25/18* (2013.01); *F01D 25/183* (2013.01); *F01D 25/166* (2013.01); *F01D 25/186* (2013.01); *F05D 2220/40* (2013.01); *F05D 2240/70* (2013.01); *F16C 17/18* (2013.01); *F16C 2360/24* (2013.01)

(58) Field of Classification Search
CPC .... F05D 2220/40; F01D 25/16; F01D 25/166; F01D 25/18; F01D 25/183; F01D 25/186
USPC ................................................. 417/405–407
See application file for complete search history.

(56) References Cited

U.S. PATENT DOCUMENTS

| | | | | |
|---|---|---|---|---|
| 4,240,678 A | * | 12/1980 | Sarle et al. ..................... 384/369 |
| 4,268,229 A | * | 5/1981 | Berg .............................. 417/407 |
| 4,314,705 A | * | 2/1982 | Shimizu ........................ 277/346 |

FOREIGN PATENT DOCUMENTS

| | | |
|---|---|---|
| JP | 05-065829 A | 3/1993 |
| JP | 11-062600 A | 3/1999 |
| JP | 2004-285887 A | 10/2004 |
| JP | 2008-286079 A | 11/2008 |

* cited by examiner

*Primary Examiner* — Peter J Bertheaud
(74) *Attorney, Agent, or Firm* — A. Michael Tucker; Stephen A. Pendorf; Patent Central LLC

(57) ABSTRACT

An exhaust-gas turbocharger (1), having a shaft (2) on which a compressor wheel (3) and a turbine wheel (4) are arranged, and a bearing housing (5) which has a turbine-side radial bearing bush (6) and which has an oil collecting chamber (7) arranged between the turbine-side radial bearing bush (6) and a turbine-side bearing housing end region (8). The shaft (2) has a shoulder (9) which extends outward in the radial direction (R) into the oil collecting chamber (7) and, together with a radial-bearing-side first delimiting wall (10) of the oil collecting chamber (7), delimits a gap (11).

Figure 1:
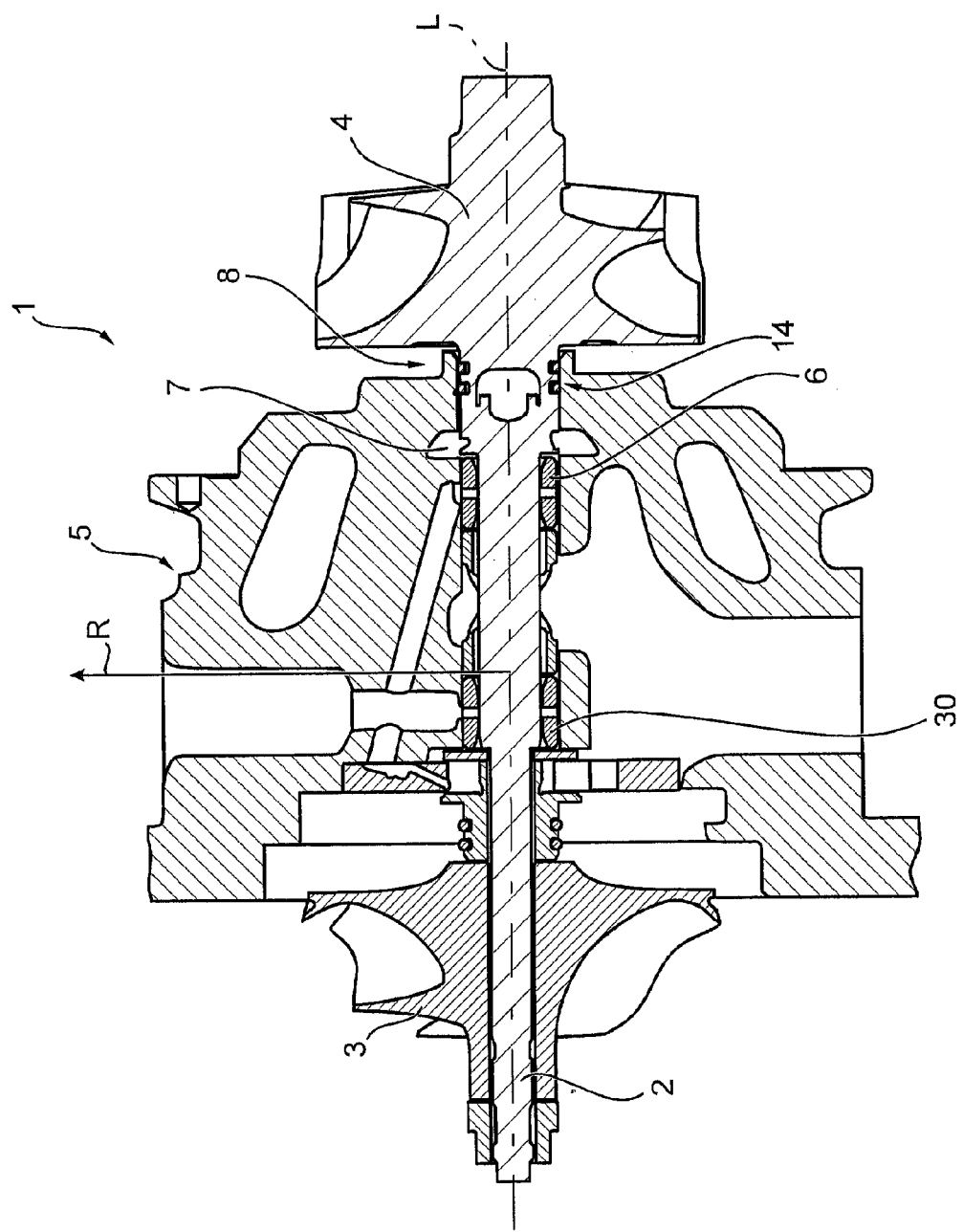

5 Claims, 4 Drawing Sheets

EXHAUST-GAS TURBOCHARGER

The invention relates to an exhaust-gas turbocharger as per the preamble of claim 1.

An exhaust-gas turbocharger of said type is known from DE 10 2007 027 869 A1. Even though measures for minimizing oil losses into the turbine are implemented in said turbocharger, tests carried out within the context of the invention have shown that said measures are inadequate.

It is therefore an object of the present invention to provide an exhaust-gas turbocharger of the type specified in the preamble of claim 1 which makes it possible to substantially prevent oil losses into the turbine.

Said object is achieved by means of the features of claim 1.

The invention proposes a turbine-side dynamic sealing concept with flow-controlled oil discharge, wherein the oil at the turbine side of the turbine-side radial bearing bush is directed via a narrow gap and introduced radially into an oil collecting chamber which is machined and/or smoothed at the inside, preferably by being turned out. After the introduction of the oil into said oil collecting chamber, and by means of the high rotational speed of the shaft and the narrow gap between a shaft shoulder and the radial-bearing-side delimiting wall of the oil collecting chamber, the oil is conducted onward by the centrifugal force to the outer diameter, which becomes smaller in the direction of the turbine side, of the oil collecting chamber and introduced into an oil chamber or oil core preferably provided with a flow guiding element.

The subclaims relate to advantageous refinements of the invention.

If the flow guiding element (also referred to as "gusset") is provided, this and the defined oil guidance in the oil collecting chamber have the effect that the formation of turbulence and the formation of oil foam and/or oil mist can be reduced.

Furthermore, by means of said measure, the oil is discharged in a targeted fashion and kept remote from a piston ring, sealing gap situated between the oil collecting chamber and a piston ring seal.

By means of the encircling cut-out turned-out portion of the oil collecting chamber and a connection of the casting core to the underside of the turned-out portion or of the oil collecting chamber core, the piston ring sealing gap can be lengthened. This results in an elimination of the minimum wall thickness of the sand core and an improvement in casting tolerances.

By means of the narrow gap between the bearing housing and the shaft shoulder and rotor journal, the oil throughput from the radial bearing to the turbine side is reduced. For improved oil discharge between the bearing points, it is also possible for the turbine-side bearing block to be shortened in relation to known designs by means of an oil core modification.

Figure 2:
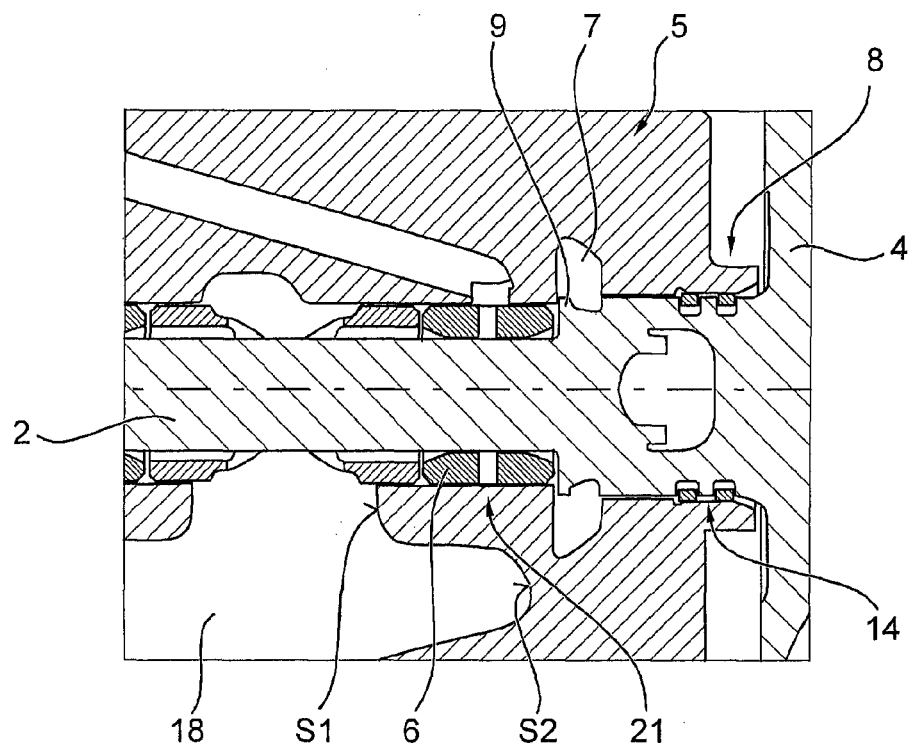
Figure 3:
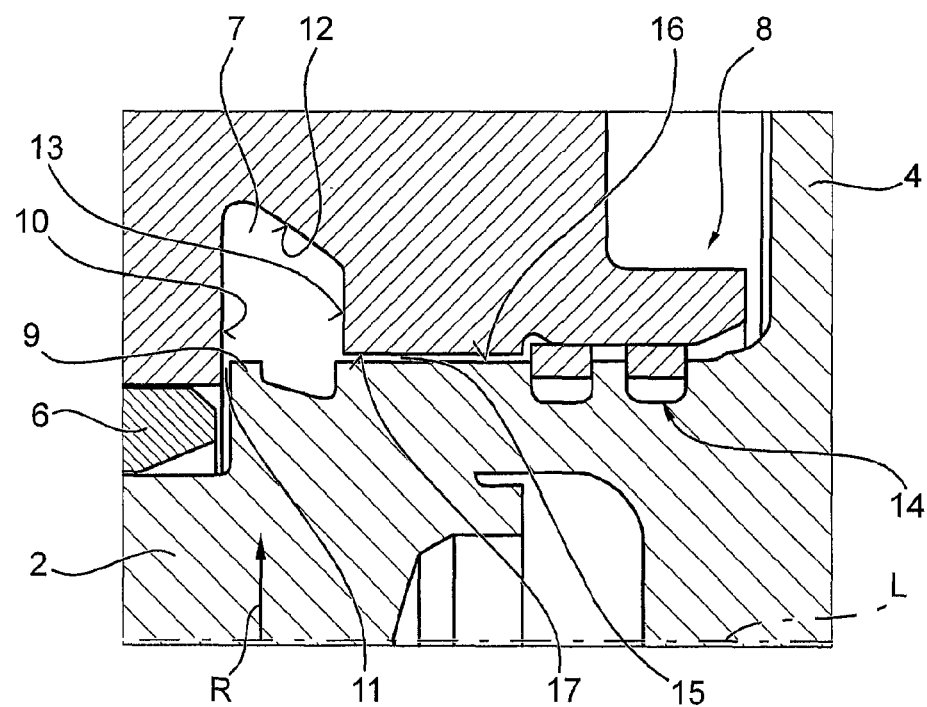
Figure 4:
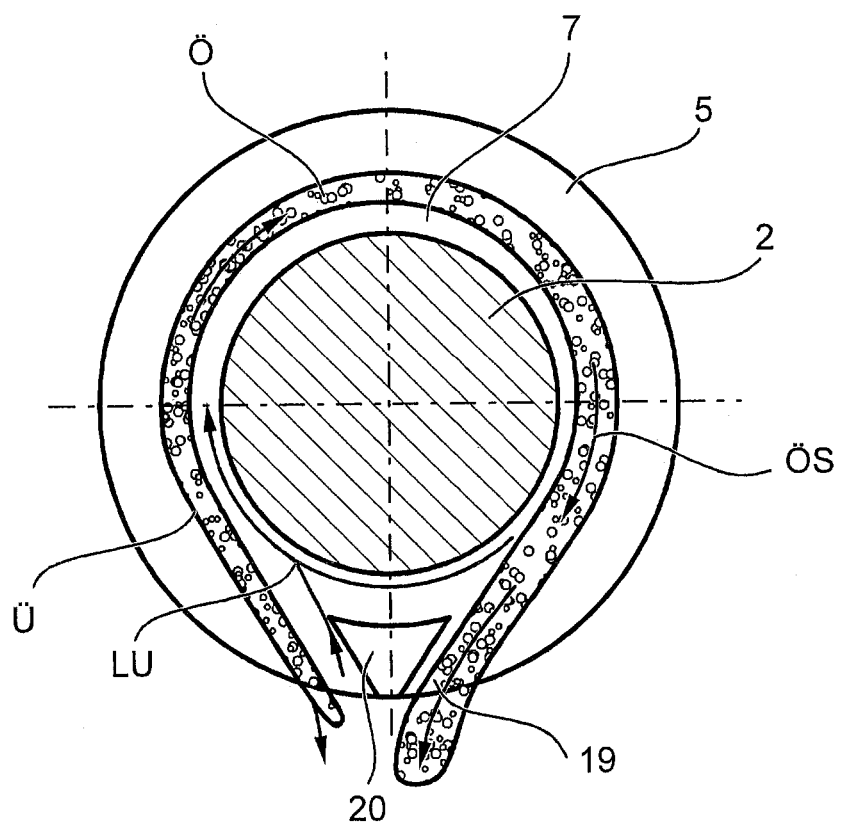
Figure 5:
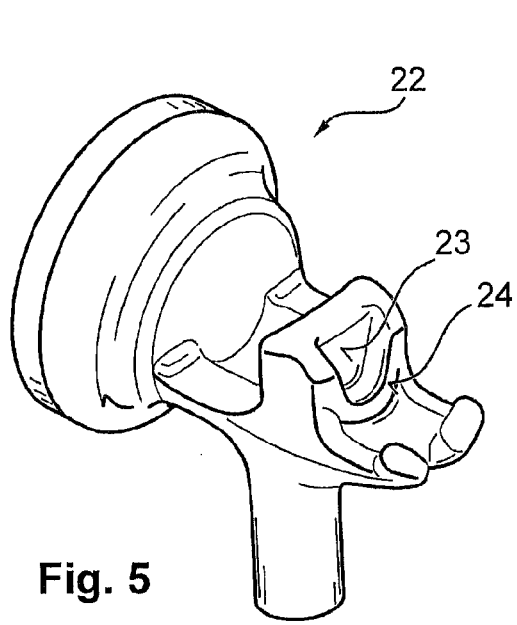
Figure 6:
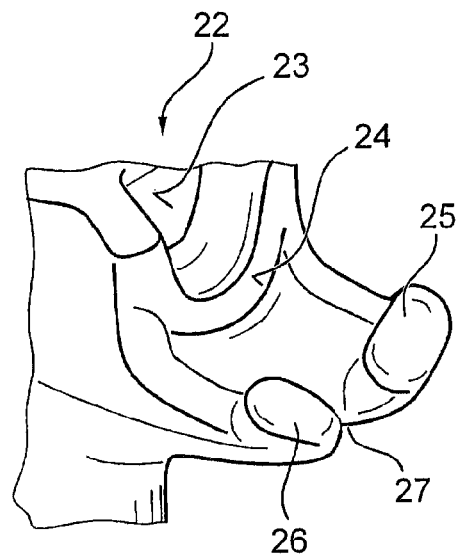
Figure 7:
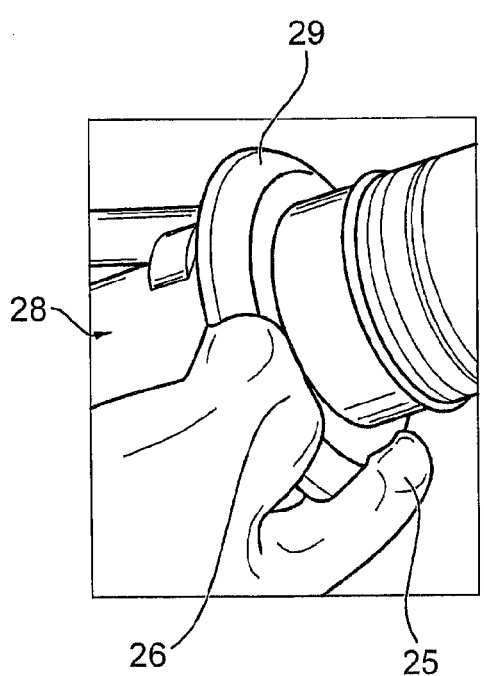
Figure 8:
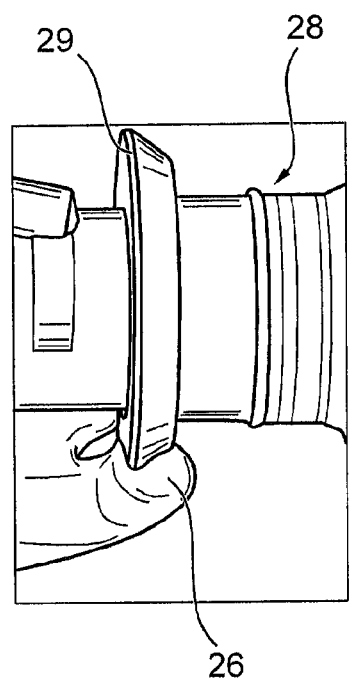

Further details, advantages and features of the present invention will emerge from the following description of exemplary embodiments on the basis of the drawing, in which:

FIG. 1 shows a schematically slightly simplified illustration of an exhaust-gas turbocharger according to the invention, FIG. 2 shows an enlarged illustration of a part of the bearing housing of the exhaust-gas turbocharger in the region of a turbine-side radial bearing bush, FIG. 3 shows an illustration, enlarged yet further in relation to FIG. 2, of the region illustrated in FIG. 2, FIG. 4 shows a schematically highly simplified illustration of the bearing housing in the region of an outlet of an oil collecting chamber into an oil chamber, FIGS. 5, 6 show illustrations of a sand core for forming the oil chamber of the bearing housing of the exhaust-gas turbocharger, and FIGS. 7, 8 show partial illustrations of the sand core according to FIGS. 5 and 6 in connection with a further core for producing the collecting chamber.

FIG. 1 illustrates an exhaust-gas turbocharger 1 according to the invention which comprises a shaft 2, a compressor wheel 3 and, attached to the other end of the shaft, a turbine wheel 4. Illustrated between the compressor wheel 3 and the turbine wheel 4 is a bearing housing 5 which has a turbine-side bearing arrangement or radial bearing bush 6 and also a compressor-side bearing arrangement or radial bearing bush 30.

The exhaust-gas turbocharger 1, or the bearing housing 5, also has an oil collecting chamber 7 and a piston ring seal 14 in the bearing housing end region 8.

The exhaust-gas turbocharger 1 self-evidently also has a compressor housing and a turbine housing and other components provided depending on the charger type, said components however not being illustrated in FIG. 1 because they are not required for explaining the principles of the present invention.

It emerges from the juxtaposition of FIGS. 2 and 3 that the shaft 2 of the exhaust-gas turbocharger 1 has a shoulder 9 which extends outward in the radial direction R into the oil collecting chamber 7. The radial direction R is illustrated both in FIG. 1 and in FIG. 3 as a directional arrow perpendicular to the charger axis L. The shoulder 9 may also be referred to as a rotor journal and, on account of its radially outwardly directed extent, delimits together with a radial-bearing-side first delimiting wall 10 of the oil collecting chamber 7 a gap 11 which is preferably of very narrow design.

The oil collecting chamber 7 is formed as a turned-out chamber such that the first delimiting wall 10, a top wall 12 and a second delimiting wall 13 of the oil collecting chamber 7 are machined so as to have smooth surfaces. This is preferable in order to be able to attain the said narrow design of the gap 11.

As can be seen in particular from FIG. 3, the top wall 12 slopes down from the first delimiting wall 10 to the second delimiting wall 13, that is to say runs from a large diameter region to a small diameter region from the first delimiting wall 10 to the second delimiting wall 13 which is at the side of the piston ring seal.

FIG. 3 also shows the provision of a piston ring sealing gap 15 which is preferably of long design and which is formed between an outer circumferential surface 16 of the shaft 2 and a bearing housing inner circumferential surface 17. Said piston ring sealing gap 15 is arranged between the oil collecting chamber 7 and the piston ring seal 14 which is arranged in the bearing housing end region 8.

FIG. 4 shows a schematically highly simplified end view of the bearing housing 5, the shaft 2 and the oil collecting chamber 7, wherein it should be explained that an air flow LU, via a smooth transition Ü, drags the oil Ö upward in the oil collecting chamber 7 and allows said oil to flow out via a funnel-shaped outlet 19, in which a flow guiding element 20 is arranged, into the oil chamber 18 of the bearing housing 5. The flow guiding element 20 is formed in the manner of a gusset or a truncated cone, as can be seen from the diagrammatic illustration of FIG. 4. This yields, in conjunction with the high rotational speed of the shaft 2, a targeted oil flow ÖS.

To be able to form the oil chamber 18 in the bearing housing 5, a sand core 22 may be provided which is illustrated in FIGS. 5 and 6. To be able to manufacture a turbine-side bearing block 21 (see FIG. 2) which is shortened in relation to known designs, the sand core 22 has a surface 23 and, spaced apart axially therefrom, a surface 24, which surfaces correspond, in the fully cast state, to the surfaces S1 and S2 denoted in FIG. 2.

The sand core 22 also has lugs 25 and 26 which delimit a cutout 27 which, in the fully cast state, yields the flow guiding element 20 illustrated in FIG. 4.

FIGS. 7 and 8 show a sand core 22 in the region of its lugs 25 and 26 and also a model of the mechanical machining 28 which permits in particular the formation 29 of the oil collecting chamber 7. Here, the lugs 25 and 26 form the connection of the core to the underside of the turned-out portion or of the oil collecting chamber 7.

In addition to the above written disclosure of the invention, reference is hereby explicitly made to the diagrammatic illustration of the invention in FIGS. 1 to 8.

LIST OF REFERENCE SYMBOLS

1 Exhaust-gas turbocharger
2 Shaft
3 Compressor wheel
4 Turbine wheel
5 Bearing housing
6 Turbine-side radial bearing bush
7 Oil collecting chamber
8 Bearing housing end region
9 Shoulder/shaft shoulder/rotor journal
10 First delimiting wall
11 Gap
12 Top wall
13 Second delimiting wall
14 Piston ring seal
15 Piston ring sealing gap
16 Outer circumferential surface of the shaft 2
17 Bearing housing inner circumferential surface
18 Oil chamber of the bearing housing 5
19 Funnel-shaped outlet
20 Flow guiding element/gusset
21 Turbine-side bearing block
22 Sand core
23, 24 Surfaces
25, 26 Lugs
27 Recess
28 Model of the mechanical machining
29 Turned-out portion for oil collecting chamber
30 Compressor-side radial bearing bush L Charger axis
R Radial direction
LU Air flow
Ü Smooth tangential transition
Ö Oil
ÖS Oil flow
S1, S2 Surfaces

The invention claimed is:
1. An exhaust-gas turbocharger (1), including
   a shaft (2) on which a compressor wheel (3) and a turbine wheel (4) are arranged, and
   a bearing housing (5)
      which has a turbine-side radial bearing bush (6) and
      which has an oil collecting chamber (7) arranged between the turbine-side radial bearing bush (6) and a turbine-side bearing housing end region (8),
   wherein
      the shaft (2) has a shoulder (9) which extends outward in the radial direction (R) into the oil collecting chamber (7) and which, together with a radial-bearing-side first delimiting wall (10) of the oil collecting chamber (7), delimits a gap (11),
      wherein the oil collecting chamber (7) is connected to an oil chamber (18) of the bearing housing (5),
      wherein the oil collecting chamber (7) has a funnel-shaped outlet (19) into the oil chamber (18), and
      wherein a gusset-like flow guiding element (20) is arranged in the funnel-shaped outlet (19).
2. The exhaust-gas turbocharger as claimed in claim 1, wherein the first delimiting wall (10), a top wall (12) and a second delimiting wall (13) of the oil collecting chamber are machined.
3. The exhaust-gas turbocharger as claimed in claim 2, wherein the top wall (12) slopes down to the second delimiting wall (13).
4. The exhaust-gas turbocharger as claimed in claim 1, wherein between the oil collecting chamber (7) and a piston ring seal (14) arranged in the bearing housing end region (8), a piston ring sealing gap (15) is arranged between an outer circumferential surface (16) of the shaft (2) and a bearing housing inner circumferential surface (17).
5. The exhaust-gas turbocharger as claimed in claim 1, wherein the first delimiting wall (10), a top wall (12) and a second delimiting wall (13) of the oil collecting chamber are machined by turning.

* * * * *